(12) United States Patent
Comrie

(10) Patent No.: US 7,468,170 B2
(45) Date of Patent: Dec. 23, 2008

(54) NITROGENOUS SORBENT FOR COAL COMBUSTION

(76) Inventor: Douglas C Comrie, 4281 Meadowlark Trail, Stow, OH (US) 44224

( * ) Notice: Subject to any disclaimer, the term of this patent is extended or adjusted under 35 U.S.C. 154(b) by 204 days.

(21) Appl. No.: 11/642,733

(22) Filed: Dec. 20, 2006

(65) Prior Publication Data

US 2007/0140941 A1    Jun. 21, 2007

Related U.S. Application Data

(60) Provisional application No. 60/752,432, filed on Dec. 21, 2005.

(51) Int. Cl.
| | |
|---|---|
| B01D 53/50 | (2006.01) |
| B01D 53/64 | (2006.01) |
| F23B 90/00 | (2006.01) |
| F23B 99/00 | (2006.01) |
| F23J 15/00 | (2006.01) |
| F23K 1/00 | (2006.01) |

(52) U.S. Cl. .................. 423/210; 431/2; 423/242.1; 423/243.08; 423/244.07; 423/DIG. 5; 422/105; 110/203; 110/215; 110/341; 110/342; 110/345; 110/346; 110/347; 110/348

(58) Field of Classification Search ............... 431/2; 423/210, 242.1, 243.08, 244.07, DIG. 5; 422/105; 110/203, 215, 341, 342, 345, 346, 110/347, 348
See application file for complete search history.

(56) References Cited

U.S. PATENT DOCUMENTS 5,735,929 A * 4/1998 McLaughlin .................. 71/63

* cited by examiner

*Primary Examiner*—Timothy C Vanoy
(74) *Attorney, Agent, or Firm*—Harness, Dickey & Pierce, PLC

(57) ABSTRACT

Sorbent compositions for coal contain nitrogenous components that reduce the level of mercury and/or sulfur emitted into the atmosphere upon combustion. The sorbent compositions are added directly to the fuel before combustion; directly into the fireball during combustion; are added to the fuel before combustion and into the flue gas post combustion zone; or are added completely into the flue gas post combustion zone, preferably where the flue gas temperature is at least 500° C. The sorbent compositions comprise a source of nitrate ions, a source of nitrite ions, or a combination of nitrate and nitrite sources. The sorbents are added as solids or as solutions in water. In various embodiments, the sorbent compositions further comprise a source of halogen such as bromide.

27 Claims, No Drawings

NITROGENOUS SORBENT FOR COAL COMBUSTION

CROSS-REFERENCE TO RELATED APPLICATIONS

This application claims the benefit of U.S. Provisional Application No. 60/752,432, filed on Dec. 21, 2005. The disclosure of the above application is incorporated herein by reference.

FIELD OF THE INVENTION

The invention relates to nitrogenous sorbents for coal combustion. In particular, the invention provides for addition of various sorbent compositions into a facility during coal combustion to reduce the amount of mercury emitted by the facility

INTRODUCTION

Significant coal resources exist around the world capable of meeting large portions of the world's energy needs into the next two centuries. High sulfur coal is plentiful, but requires remediation steps to prevent excess sulfur from being released into the atmosphere upon combustion. In the United States, low sulfur coal exists in the form of low BTU value coal in the Powder River basin of Wyoming and Montana, in lignite deposits in the North Central region of North and South Dakota, and in lignite deposits in Texas. But even when coals contain low sulfur, they still contain non-negligible levels of elemental and oxidized mercury and/or other heavy metals.

Unfortunately, mercury is at least partially volatilized upon combustion of coal. As a result, the mercury tends not to stay with the ash, but rather becomes a component of the flue gases. If remediation is not undertaken, the mercury tends to escape from the coal burning facility into the surrounding atmosphere, leading to environmental problems. Some mercury today is captured by utilities, for example in wet scrubber and SCR control systems. However, most mercury is not captured and is therefore released through the exhaust stack.

In the United States, the Clean Air Act Amendments of 1990 contemplated the regulation and control of mercury. A mercury study in the report to Congress in 1997 by the Environmental Protection Agency (EPA) further defined the bounds of mercury release from power plants in the United States. In December 2000, the EPA decided to regulate mercury, and published proposed clean air mercury rules in January and March of 2004. A set of regulations for required mercury reduction from US coal burning plants has now been promulgated by the United States Environmental Protection Agency.

In addition to wet scrubber and SCR control systems that tend to remove mercury partially from the flue gases of coal combustion, other methods of control have included the use of activated carbon systems. Use of such systems tends to be associated with high treatment costs and elevated capital costs. Further, the use of activated carbon systems leads to carbon contamination of the fly ash collected in exhaust air treatments such as the bag house and electrostatic precipitators.

Mercury emissions into the atmosphere in the United States are approximately 50 tons per year. A significant fraction of the release comes from emissions from coal burning facilities such as electric utilities. Mercury is a known environmental hazard and leads to health problems for both humans and non-human animal species. To safeguard the health of the public and to protect the environment, the utility industry is continuing to develop, test, and implement systems to reduce the level of mercury emissions from its plants. In combustion of carbonaceous materials, it is desirable to have a process wherein mercury and other undesirable compounds are captured and retained after the combustion phase so that they are not released into the atmosphere.

SUMMARY

Processes and compositions are provided for decreasing emissions of mercury upon combustion of fuels such as coal. Various sorbent compositions are provided that contain nitrogenous components that reduce the level of mercury and/or sulfur emitted into the atmosphere upon burning of coal.

In various embodiments, the sorbent compositions are added directly to the fuel before combustion; are added to the fuel before combustion and into the flue gas post combustion zone; are added into the fireball, or are added completely into the flue gas post combustion zone. The sorbent compositions comprise a source of nitrate ions, a source of nitrite ions, or a combination of nitrate and nitrite sources. The sorbents are added as solids or as solutions in water. In various embodiments, the sorbent compositions further comprise a source of halogen such as bromide.

In various embodiments sorbent compositions containing nitrate and/or nitrite are added to the fuel as a powder or a liquid prior to combustion. Alternatively or in addition, the sorbent compositions containing nitrate and/or nitrite are injected into the flue gas, preferably at a point after the combustion chamber where the temperature is higher than about 500° C. (932° F.), preferably higher than 1500° F. (about 800° C.).

In preferred embodiments, the sorbent compositions further contain other components, especially a source of calcium, a source of silica, and/or a source of alumina. Thus, in one embodiment, the invention provides for singular and multiple applications of multi-element oxidizers, promoters, and sorbents to coal prior to, during and/or after combustion in a furnace. In various embodiments, the components of the sorbent compositions develop ceramic characteristics upon combustion and subsequent calcination of the components with the carbonaceous materials. In various embodiments, use of the sorbent compositions reduces mercury emissions by capturing and stabilizing oxidized and elemental mercury with multiple-element remediation materials such as calcium oxides, calcium bromides, other calcium halogens, as well as oxides of silicon, aluminum, iron, magnesium, sodium, and potassium. Further, the ceramic structure formed in the fly ash by the use of the sorbent is believed to contribute to the resulting non-leaching property of the ash.

In various embodiments, mercury emissions from coal burning facilities are reduced to an extent that 90% or more of the mercury in the coal is captured in the ash rather than emitted from the stack. In some embodiments, mercury is captured in the fly ash in non-leaching form. The mercury remediation processes can be used together with sorbent compositions and other processes that remove sulfur from the combustion gas stream. Thus in preferred embodiments, significant sulfur reduction is achieved along with 90% plus capture of mercury.

DESCRIPTION

In various embodiments, the invention provides compositions and methods for reducing emissions of mercury that arise from the combustion of mercury containing fuels such as coal. A commercially valuable embodiment is use of the invention to reduce mercury emissions from coal burning facilities to protect the environment and comply with government regulations and/or treaty obligations.

Much of the present discussion refers to coal as the fuel; it is to be understood that the description of coal burning is for illustrative purposes only and the invention is not necessarily to be limited thereby. For example, other types of facilities that burn fuels with potentially harmful levels of mercury or other heavy metals include incineration plants, such as those used to incinerate household waste, hazardous waste, or sewage sludge. A variety of waste streams are incinerated in such plants, which often operates in populated areas for logistical reasons. Household waste is known to contain mercury from a variety of sources, such as from discarded batteries and thermometers as well as from a wide variety of consumer items with detectable mercury levels. Hazardous waste streams include mercury from a number of commercial or industrial sources. Sewage sludge contains mercury resulting from ingestion and elimination of mercury-containing foods and from other sources. All of the waste streams also contain mercury from a number of natural sources as well. When burned in an incinerator, the wastes can release volatile mercury or mercury compounds into the air, which tend to settle to the ground close to the incineration plant, leading to local contamination of the soil and groundwater, as well as lowered air quality. Accordingly, in various embodiments of the invention, waste streams containing mercury or other heavy metals are incinerated in the presence of various sorbent compositions added into the incineration system. In preferred embodiments, nitrogenous compounds and preferably silica and alumina are added in sufficient amounts to reduce mercury emissions into the atmosphere and to render mercury non-leachable that is captured in the ash.

Systems and facilities that burn fuels containing mercury are described with particular attention to the example of a coal burning facility such as used by electrical utilities. Such facilities generally have some kind of feeding mechanism to deliver the coal into a furnace where the coal is burned or combusted. The feeding mechanism can be any device or apparatus suitable for use. Non-limiting examples include conveyer systems, screw extrusion systems, and the like. In operation, a mercury-containing fuel such as coal is fed into the furnace at a rate suitable to achieve the output desired from the furnace. Generally, the heat output from the furnace is used to boil water for steam to provide direct heat, or else the steam is used to turn turbines that operate generators to produce electricity.

In one embodiment, a method is provided for reducing the amount of mercury in the combustion gases resulting from burning mercury containing coal. The method involves introducing a sorbent composition into the combustion gases, preferably in a zone where the temperature is at least 500° C. The sorbent composition contains an effective amount of a nitrate salt, an effective amount of a nitrite salt, or a combination of a nitrite salt and a nitrate salt. In various embodiments, the temperature of zone into which the sorbent composition is introduced is greater than 800° C.

In another embodiment, the disclosure describes a method for operating a fuel burning facility, including capturing 90% or more of the mercury in the fuel during combustion. A mercury containing fuel such as coal is burned in the facility, and a sorbent composition comprising a nitrate salt and/or a nitrite salt is injected into flue gases of the facility, preferably where the temperature of the gases is in the range of 1500° F. to 2300° F. The mercury level in the flue gases is monitored downstream of the sorbent injection point, and the rate of sorbent addition is adjusted depending on the measured mercury level to achieve 90% or greater capture of the mercury in the fuel. In a preferred embodiment, the method is used to burn coal for energy production, while reducing or eliminating the emissions of mercury into the atmosphere that would otherwise occur. In various embodiments, reduction of mercury emissions is achieved without the use special scrubbers, avoiding great capital expense.

In another embodiment, the disclosure describes a method for reducing sulfur and/or mercury during combustion of coal. In various embodiments, the invention involves burning coal in the presence of a nitrite salt and/or a nitrate salt. During combustion, the mercury level of the flue gases is measured and the addition rate or treatment level of the nitrate and/or nitrate salts is adjusted based on the measured mercury level. For example, if the mercury level measured in the flue gases is above a targeted level, the rate of nitrite and/or nitrate addition is preferably increased in order to bring the level of mercury emissions below the targeted level.

In another embodiment, the invention provides a method for burning coal with decreased emissions of mercury. Coal is combusted in a coal burning system to produce flue gases and ash. During combustion, calcium nitrite and/or calcium nitrate are added into the coal burning system. Preferably, the mercury level in the flue gases is monitored and the rate of addition of the calcium nitrate and calcium nitrite is adjusted depending on measured mercury level. In various embodiments, the calcium nitrate and calcium nitrite are added as solids or as an aqueous solution. The calcium nitrate and calcium nitrite are added at various points in the coal burning system, including prior to pulverization, onto pulverized coal, into the furnace during combustion, into the fireball during combustion, and into the convective pathway downstream of the furnace.

The invention also provides for burning of carbonaceous mercury containing fuel other than coal. Non-limiting examples include municipal waste, sewage sludge, and the like. A sorbent composition comprising a nitrate salt and/or a nitrite salt, and preferably comprising the calcium salts, is added into the fuel burning system during combustion. Addition is made pre-combustion, co-combustion, and/or post combustion. Preferably, mercury emissions from the fuel burning system are monitored and the addition rate of the sorbent is adjusted depending on the measured level.

In a typical coal burning facility, raw coal arrives in railcars and is delivered onto a receiving belt, which delivers the coal into a pug mill. From the pug mill, the coal is discharged to a feed belt and deposited in a coal storage area. Under the coal storage area there is typically a grate and bin area; from there a belt transports the coal to an open stockpile area, sometimes called a bunker. From the bunker, the coal is delivered by belt or other means to a pulverizer. From the pulverizer the pulverized coal is delivered to the furnace for combustion. Sorbent compositions according to the invention are added in various embodiments to the raw coal, in the pug mill, on the receiving belt or feed belt, in the coal storage area, in the pulverizer before or during pulverization, and/or while being transported from the pulverizer to the furnace for combustion. Conveniently, the sorbents are added to the coal during processes that mix the coal such as the in the pug mill or in the pulverizer. In a preferred embodiment, the sorbents are added onto the coal in the pulverizers.

In addition to or instead of addition of sorbent to the coal upstream of the furnace described in the paragraph above, in various embodiments the sorbents are added into the furnace during combustion and/or into plant sections downstream of the furnace, preferably where the flue gases have a temperature of above 500° C., preferably above 800° C.

During operation coal is fed into the furnace and burned in the presence of oxygen. The temperature of combustion depends on the nature of the fuel. When a high value fuel such as coal is burned, typical flame temperatures in the combustion chamber are on the order of 2700° F. (about 1480° C.) to about 3000° F. (about 1640° C.). Downstream of the furnace or boiler where the fed fuel is combusted, the facility provides convective pathways for the combustion gases, which for convenience are sometimes referred to as flue gases. Hot combustion gases and air move by convection away from the flame through the convective pathway in a downstream direction (i.e., downstream in relation to the fireball). The convective pathway of the facility contains a number of zones characterized by the temperature of the gases and combustion products in each zone. Generally, the temperature of the combustion gas falls as it moves in a direction downstream from the fireball. The combustion gases contain carbon dioxide as well as various undesirable gases containing sulfur and mercury. The convective pathways are also filled with a variety of ash which is swept along with the high temperature gases. To remove the ash before emission into the atmosphere, particulate removal systems are used. A variety of such removal systems, such as electrostatic precipitators and a bag house, are generally disposed in the convective pathway. In addition, chemical scrubbers can be positioned in the convective pathway. Additionally, there may be provided various instruments to monitor components of the gas such as sulfur and mercury.

From the furnace, where the coal is burning at a temperature of as high as approximately 2700° F.-3000° F. (about 1480° C.-1650° C.), the fly ash and combustion gases move downstream in the convective pathway to zones of ever decreasing temperature. Immediately downstream of the fireball is a zone with temperature less that 2700° F. Further downstream, a point is reached where the temperature has cooled to about 1500° F. Between the two points is a zone having a temperature from about 1500° F. to about 2700° F. Further downstream, a zone of less than 1500° F. is reached, and so on. Further along in the convective pathway, the gases and fly ash pass through lower temperature zones until the baghouse or electrostatic precipitator is reached, which typically has a temperature of about 300° F. before the gases are emitted up the stack.

In various embodiments, the process of combusting a mercury-containing fuel calls for the application of a sorbent composition that contains nitrogenous components directly into the furnace during combustion (addition "co-combustion")

directly to a fuel such as coal before combustion (addition "pre-combustion");

directly into the gaseous stream after combustion, preferably in a temperature zone of between 2700° F. and 1500° F. (addition "post-combustion"); or in a combination of pre-combustion, co-combustion, and post-combustion additions.

In various embodiments, mercury emissions and/or sulfur emissions from the coal burning facility are monitored. Depending on the level of mercury and/or sulfur in the flue gas prior to emission from the plant, the amount of sorbent composition added pre-, co-, and/or post-combustion is raised, lowered, or is maintained unchanged. In general, it is desirable to remove as high a level of mercury and/or sulfur as is possible. In typical embodiments, mercury removal of 90% and greater is achieved, based on the total amount of mercury in the coal. This number refers to the mercury removed from the flue gases so that mercury is not released through the stack into the atmosphere. To minimize the amount of sorbent added into the coal burning process so as to reduce the overall amount of ash produced in the furnace, it is desirable in many embodiments to use the measurements of mercury and/or sulfur emissions to adjust the sorbent composition rate of addition to achieve the desired reduction without adding excess material into the system.

In various embodiments, oxidized mercury from combustion reports to the bag house or electrostatic precipitator and becomes part of the overall ash content of the coal burning plant; as such, the mercury is not emitted into the atmosphere. In preferred embodiments, the mercury in the ash is resistant to leaching under acidic conditions. That is, heavy metals in the ash do not leach beyond regulatory levels. Because of this, the ash from the combustion (coal ash) can be sold in commerce and used, for example, as a cementitious material to make Portland cements as well as concrete products and ready mixes.

In preferred embodiments, leaching of heavy metals is monitored or analyzed periodically or continuously during combustion. The amount of sorbent, particularly of sorbent components with Si ($SiO_2$ or equivalents) and/or Al ($Al_2O_3$ or equivalents), is adjusted based on the analytical result to maintain the leaching in a desired range.

Sorbent compositions of the invention contain nitrogenous components. In various embodiments, the nitrogenous components comprise one or more nitrate salts and/or one or more nitrite salts. When both nitrate and nitrite components are present, preferably the weight ratio of one to the other ranges from 99:1 to 1:99. In some embodiments, approximately equal weight proportions are preferred such as about 50:50. The nitrogenous compounds are provided as a blend of solids, for example powders, or as a solution in a suitable solvent such as water. Suitable nitrates and nitrites include, without limitation, the nitrates and nitrites of Li, Na, K, Be, Mg, Ca, Ti, Zr, Fe, Al, Si, and $NH_4^+$. Normally, cations of heavy metals or metals of environmental concern should be avoided. Preferred nitrates and nitrites include those that provide other elements useful in reducing other undesirable components such as sulfur and/or those that tend to decrease the amount of mercury and other heavy metals leaching from the resulting ash. Among these are calcium, iron, silicon, and aluminum. In various embodiments, calcium salts are preferred.

Preferred sorbents include a combination of nitrate and nitrite ions, along with a source of calcium. Non-limiting examples, in addition to calcium nitrate and calcium nitrite, of calcium sources include calcium oxides, calcium hydroxides, calcium carbonate, calcium bicarbonate, calcium sulfate, calcium bisulfate, calcium acetate, calcium citrate, calcium phosphate, calcium hydrogen phosphate, and calcium minerals such as apatite and the like. Other examples include basic powders that contain calcium. Non-limiting examples of such powders include Portland cement, cement kiln dust (ckd), lime kiln dust (LKD), and sugar beet lime (a by-product of sugar production). In various embodiments, sources of calcium include calcium halides, such as calcium bromide, calcium chloride, and calcium iodide. Organic calcium compounds can also be used. Non-limiting examples include calcium salts of carboxylic acids, calcium alkoxylates, and organocalcium compounds. In various embodiments, the organic calcium compounds tend to be less preferred because of expense and availability.

In one embodiment, the nitrate, nitrite, and calcium are provided by a combination or mixture of calcium nitrate and calcium nitrite. Alternatively or in addition, the sorbent contains nitrate and/or nitrite components other that the calcium salts, and calcium compounds other than the nitrate and nitrite. Soluble calcium nitrate and -nitrite components are conveniently provided in the form of an aqueous solution. A non-limiting example is a water solution containing 20% by weight calcium nitrate and 20% by weight calcium nitrite.

It is desirable to add sorbents containing nitrogenous components at levels effective to remove sulfur and/or mercury from the flue gases of the burning coal, but not in an over abundant amount that would lead to production of excess ash. In various embodiments, the nitrogenous components are added, as powders, solutions, or combination at a total level of from about 0.05% to about 20%, preferably about 0.1% to about 10% by weight, based on the weight of the coal or based on the rate of combustion of the coal.

When the sorbent composition is a solution of soluble solids in a solvent, the addition or treatment level is based on total delivery of the solids at the stated rate. To illustrate, a 50% solution would be used at a rate of 6% to achieve a treatment or addition rate of 3%.

When treating the coal pre-combustion, the sorbent composition is mixed with the coal before, after, or during pulverization. In a continuous process, the sorbent is added onto the coal at a rate of 0.05% to about 20%, preferably about 0.1 to 10% by weight, based on the rate of consumption of the coal by combustion. Likewise, when the sorbent composition is added into the furnace during combustion or into the convective pathway downstream of the furnace, addition is preferably made at the noted rates based on the rate at which the coal is being consumed by combustion.

In various embodiments, sorbent compositions are added into the coal burning system at a rate of 0.1% to 6% or 0.1% to 3% by weight, based on the weight of coal being treated (in batch) or the rate of the coal being consumed (in a continuous or "on-the-fly" treatment). In some embodiments, treatment is at a level of 0.1%-1% or 0.3%-1%, again based on the addition rate of solids in the sorbent composition. Preferably, at least 0.1% of a nitrate salt and/or at least 0.1% of a nitrite salt is added by way of the sorbent composition, based on the weight of the coal being treated or the rate of coal being consumed by combustion. In some embodiments, at least 0.05% of a nitrite compound and at least 0.05% of a nitrate compound are added. Treatment levels below the preferred ranges can be used, but it is expected that at some point, as the treatment level is lowered, no appreciable reduction in harmful emissions would be observed. Likewise, treatment levels higher than those described above can be used, but could lead to waste of material, as at some point no further reduction in emissions would be achieved.

In various embodiments, the sorbent compositions containing nitrogenous components further contain halogen compounds, or are used in combination with sorbent compositions that comprise a halogen compound. Sorbent compositions comprising a halogen compound contain one or more organic or inorganic compounds that contain a halogen. Halogens include chlorine, bromine, and iodine. Preferred halogens are bromine and iodine. The halogen compounds are sources of the halogens, especially of bromine and iodine. For bromine, sources of the halogen include various inorganic salts of bromine including bromides, bromates, and hypobromites. In various embodiments, organic bromine compounds are less preferred because of their cost or availability. However, organic sources of bromine containing a suitably high level of bromine are considered within the scope of the invention. Non-limiting examples of organic bromine compounds include methylene bromide, ethyl bromide, bromoform, and carbon tetrabromide. Non-limiting inorganic sources of iodine include hypoiodites, iodates, and iodides, with iodides being preferred. Organic iodine compounds can also be used. In various embodiments, sorbent compositions containing halogen are provided in the form of a liquid or of a solid composition.

When the halogen compound is an inorganic substituent, it is preferably a bromine or iodine containing salt of an alkaline earth element. Preferred alkaline earth elements include beryllium, magnesium, and calcium. Of halogen compounds, particularly preferred are bromides and iodides of alkaline earth metals such as calcium. Alkali metal compounds are effective in reducing mercury emissions. But in some embodiments, they are less preferred as they tend to cause corrosion on the boiler tubes and other steel surfaces.

In one embodiment, a sorbent composition containing nitrogenous compounds is added onto coal prior to its combustion. The coal is particulate coal, and is optionally pulverized or powdered according to conventional procedures. In various embodiments, the sorbent composition is added onto the coal as a liquid or as a solid. Generally, solid sorbent compositions are in the form of a powder. If the sorbent is added as a liquid (usually as a solution in water), in one embodiment the coal remains wet when fed into the burner. The sorbent composition can be added onto the coal continuously at the coal burning facility by spraying or mixing onto the coal while it is on a conveyor, screw extruder, or other feeding apparatus. In addition or alternatively, the sorbent composition is separately mixed with the coal at the coal burning facility or at the coal producer. In a preferred embodiment, the sorbent composition is added as a liquid or a powder to the coal as it is being fed into the burner. For example, the sorbent is applied into the pulverizers that pulverize the coal prior to injection or is applied into the coal before it enters the pulverizers.

In another embodiment, a sorbent composition containing nitrogenous compounds is inserted or injected into the convective pathway of the coal burning facility downstream of the furnace. Preferably, the sorbent composition is added into a zone of the convective pathway downstream of the fireball (caused by combustion of the coal), which zone has a temperature above about 500° C., preferably above about 800° C., and most preferably above about 1500° F. (815° C.), and less than the fireball temperature of 2700° F.-3000° F. In various embodiments, the temperature in the zone of sorbent addition is above about 1700° F. (927° C.). The zone preferably has a temperature below about 2700° F. (approximately 1482° F.). In various embodiments, the injection zone has a temperature below 2600° F., below about 2500° F. or below about 2400° F. In non-limiting examples, the injection temperature is from 1700° F. to 2300° F., from 1700° F. to 2200° F., or from about 1500° F. to about 2200° F. As with pre-combustion addition, the sorbent composition is in the form of a liquid or a solid (powder). In various embodiments, the rate of addition of sorbent into the convective pathway is varied and adjusted depending on the results of mercury and/or sulfur monitoring as described herein.

In another embodiment, a sorbent composition containing nitrogenous compounds is added or injected directly into the furnace during combustion of the coal or other fuel. Powder or liquid injectors are utilized as required by the nature of the sorbent compositions. Pre-combustion, the coal or other fuel is at ambient conditions when first contacted with the sorbent. The embodiment of co-combustion addition of sorbent (i.e., addition directly into the furnace) is characterized by the fuel being at a high combustion temperature when first contacted with the sorbent composition.

In another embodiment, sorbent compositions are added into the coal burning system during the combustion process at a number of locations in the system. Locations include onto the coal upstream of the burning chamber of the furnace; directly into the furnace or burning chamber; and in a plant section or convective pathway downstream of the furnace. In embodiments involving downstream addition, the temperature of the flue gases at the point of addition or injection is preferably at least about 500° C. (932° F.), and more preferably at least about 800° C., and typically at least 815° C. (1500° F.). In various embodiments, sorbent compositions are added at a single location, or at any combination of two or more of the locations. The sorbent compositions contain nitrogenous compounds and optionally halogen compounds. When halogen is used, in various embodiments it is added with the nitrogenous compounds in a single sorbent composition, with the nitrogenous compounds at the same location in the system but in a separate sorbent composition, or at a separate place in the combustion in a separate composition.

If desired, the rate of addition of the sorbent composition is varied to achieve a desired level of mercury emissions. In one embodiment, the level of mercury in the flue gases is monitored and the level of sorbent addition adjusted up or down or maintained unchanged as required to maintain the desired mercury level.

In various embodiments, mercury levels are monitored with conventional analytical equipment using industry standard detection and determination methods. In one embodiment, monitoring is conducted periodically, either manually or automatically. In a non-limiting example, mercury emissions are monitored once an hour to ensure compliance with government regulations. To illustrate, the Ontario Hydro method is used. In this known method, gases are collected for a pre-determined time, for example one hour. Mercury is precipitated from the collected gases, and the level is quantitated using a suitable method such as atomic absorption. Monitoring can also take place more or less frequently than once an hour, depending on technical and commercial feasibility. For example, commercial continuous mercury monitors can be set to measure mercury and produce a number at a suitable frequency, for example once every 3-7 minutes. In various embodiments, the output of the mercury monitors is used to control the rate of addition of mercury sorbent composition. Depending on the results of monitoring, the rate of addition of the sorbent is adjusted by either increasing the level of addition, decreasing it, or leaving it unchanged. To illustrate, if monitoring indicates mercury levels are higher than desired, the rate of addition of sorbent is increased until mercury levels return to a desired level. If mercury levels are at desired levels, the rate of sorbent addition can remain unchanged. Alternatively, the rate of sorbent addition can be lowered until monitoring indicates it should be increased to avoid high mercury levels. In this way, mercury emission reduction is achieved and excessive use of sorbent (with concomitant increase of ash) is avoided.

Mercury is monitored in the convective pathway at suitable locations. In various embodiments, mercury released into the atmosphere is monitored and measured on the clean side of the particulate control system. Mercury can also be monitored at a point in the convective pathway upstream of the particulate control system. Experiments show that as much as 20 to 30% of the mercury in coal is captured in the ash and not released into the atmosphere when no mercury sorbent is added. In various embodiments, addition of mercury sorbents according to the invention raises the amount of mercury capture to 90% or more. Mercury emissions into the atmosphere are correspondingly reduced.

In preferred embodiments, mercury and sulfur are monitored using industry standard methods such as those published by the American Society for Testing and Materials (ASTM) or international standards published by the International Standards Organization (ISO). An apparatus comprising an analytical instrument is preferably disposed in the convective pathway downstream of the addition points of the sorbents. In a preferred embodiment, a mercury monitor is disposed on the clean side of the particulate control system. Alternatively or in addition, the flue gases are sampled at appropriate locations in the convective pathway without the need to install an instrument or monitoring device. In various embodiments, a measured level of mercury or sulfur is used to provide feedback signals to pumps, solenoids, valves, sprayers, and other devices that are actuated or controlled to adjust the rate of addition of a sorbent composition into the coal burning system. Alternatively or in addition, the rate of sorbent addition can be adjusted by a human operator based on the observed levels of mercury and/or sulfur.

According to various aspects of the invention, sorbent compositions are added into a coal burning system in order to reduce the amount of mercury and/or sulfur being emitted from the coal burning systems into the atmosphere. In a preferred embodiment, the sorbents added into the system contain silica and alumina in addition to the nitrogenous compounds.

In various aspects, the invention is based on a discovery that the additional use of silicon- and aluminum-containing minerals tends to render the fly ash resulting from combustion of the coal non-leaching relative to heavy metals such as mercury. Accordingly, in some embodiments, the sorbent compositions contain various components that contribute silica and/or alumina to the overall composition. Alternatively, components containing silica and/or alumina are added to the various locations in the coal burning systems separately from other sorbent compositions that contain the nitrogenous components.

Normally, coal naturally contains components that contribute both silica and alumina to the ash resulting from combustion. In preferred embodiments, sorbent components contributing silica and alumina are added in sufficient amounts to add a significant extra level of silica and/or alumina over and above that naturally present in the coal. For example, it is preferred to add silica and/or alumina components to raise the silica and/or alumina content of the resulting coal ash by at least about 10% over ash resulting from coal burned without the added silica and/or alumina components.

A wide variety of inorganic minerals and materials contribute silica and/or alumina to sorbent compositions. For example, a number of minerals and commercial materials contain silicon and aluminum associated with an oxy environment. In such materials, the silicon tends to be present as tetrahedra, while the aluminum is present as tetrahedra, octahedra, or a combination of both. Chains or networks of aluminosilicate are built up in such materials by the sharing of 1, 2, or 3 oxygen atoms between silicon and aluminum tetrahedra or octahedra. Such minerals go by a variety of names, such as silica, alumina, aluminosilicates, geopolymer, silicates, and aluminates. However presented, compounds containing aluminum and/or silicon tend to produce silica and alumina upon exposure to high temperatures of combustion in the presence of oxygen In one embodiment, inorganic materials contributing silica and/or alumina to various compositions of the invention include polymorphs of $SiO_2.Al_2O_3$. For example, silliminate contains silica octahedra and alumina evenly divided between tetrahedra and octahedra. Kyanite is based on silica tetrahedra and alumina octahedra. Andalusite is another polymorph of $SiO_2.Al_2O_3$.

In other embodiments, chain silicates are used to contribute silicon (as silica) and/or aluminum (as alumina) to the compositions of the invention. Chain silicates include without limitation pyroxene and pyroxenoid silicates made of infinite chains of $SiO_4$ tetrahedra linked by sharing oxygen atoms.

Other suitable alumina- and silica-contributing components include sheet materials such as micas, clays, chrysotiles (such as asbestos), talc, soapstone, pyrophillite, and kaolinite. Such materials tend to have layer structures wherein silica and alumina octahedra and tetrahedra share two oxygen atoms. Layered aluminosilicates include clays such as kaolinite, calcium montmorillonite, sodium montmorillonite, and benzonite. Other examples include micas and talc.

Suitable aluminosilicate materials also include synthetic and natural zeolites, such as without limitation the analcime, sodalite, chabazite, natrolite, phillipsite, and mordenite groups. Other zeolite minerals include heulandite, brewsterite, epistilbite, stilbite, yagawaralite, laumontite, ferrierite, paulingite, and clinoptilolite. The zeolites are minerals or synthetic materials characterized by an aluminosilicate tetrahedral framework, ion exchangeable "large cations" (such as Na, K, Ca, Ba, and Sr) and loosely held water molecules.

In other embodiments, framework or 3D silicates, aluminates, and aluminosilicates are used. Framework silicates are characterized by a structure where $SiO_4$ tetrahedra, $AlO_4$ tetrahedra, and/or $AlO_6$ octahedra are linked in three dimensions. Non-limiting examples of framework silicates containing both silica and alumina include feldspars such as albite, anorthite, and orthoclase.

In addition, various manufactured products are commercially available that contribute either silica, alumina, or both to the compositions of the invention. For example, Portland cement is prepared by heating limestone with aluminum silicates and crushing the resulting clinker. Typical Portland cements contain approximately 70% CaO, 20% $SiO_2$, 5% $Al_2O_3$, and about 5% $Fe_2O_3$, with lesser amounts of other elements such as magnesium and the like. Additional industrial products that contain silica and/or alumina include cement kiln dust and lime kiln dust. In other embodiments, various pozzolanic materials can be used. In various embodiments, the sorbent compositions that contain nitrogenous components also contain suitable levels of aluminosilicates, Portland cement, cement kiln dust, lime kiln dust, and the like to provide the sorbent composition with at least about 2% by weight silica and at least 2% by weight alumina. Alternatively or in addition, in various embodiments, alumina and silica-containing components are added separately into the coal burning system (i.e. pre-, co-, or post-combustion) in effective amounts to provide for the production of ash with low levels of heavy metal leaching.

Although the mercury-containing fuel to be combusted may naturally contain low levels of silica and/or alumina, it is generally desirable to add amounts in addition to those naturally present. In the example of coal, it is desirable to add additional amounts of silica and alumina that are sufficient to reduce the leaching of mercury or other heavy metals from the resulting ash. In particular embodiments, a slight amount of routine experimentation is used to establish a minimum level of suitable sorbent addition. In various embodiments, an addition of sorbent is made to provide at least 0.1% each by weight of silica and alumina, preferably at least 0.2%, and more preferably at least 0.5%, based on the amount of fuel being treated or on the rate of fuel consumption by combustion.

In various embodiments, the silica to alumina ratio in the sorbent compositions ranges from about 10:1 to about 1:10. In various embodiments, silica and alumina are provided as parts of individual components or in components that provide a source of both silicon and alumina. As described above, a variety of readily available commercial products contain both silica and alumina in suitable ratios.

Because the resulting ash contains mercury or other heavy metals in a non-leaching form, it is suitable for sale for other commercial uses. Non-limiting uses of spent or waste coal ash include as an additive in a cement product such as Portland cement. In various embodiments, cement products contain up to about 10% by weight of the coal ash produced by burning compositions according to the invention. In one aspect, the non-leaching property of the mercury and other heavy metals in the coal ash makes it suitable for all known industrial uses of coal ash. As noted, a non-limiting example is as an additive or a diluent for a cement product such as Portland cement.

The cement product containing fly ash according to the invention is combined in various embodiments with aggregates to form a ready mix compound. The ready mix compound can be sold to consumers or provided to contractors, who mix the ready mix with water and form a variety of concrete products such as sidewalks, curbs, streets, pillars, culverts, pipes, and the like. The set concrete constructions are the product of hydration of ready mixes that contain coal ash according to the invention.

In another embodiment, the invention provides a hydratable or settable concrete composition made by adding water to any of the cement products or concrete products noted above. Thus the invention provides various methods of eliminating the need to landfill coal ash or fly ash resulting from combustion of coal that contains high levels of mercury. Instead of a costly disposal, the material can be sold or otherwise used as a raw material.

Although the invention is not to be limited by theory, it is believed that the sorbent compositions described above provide sources of silica and alumina into the coal burning process. Combustion of the coal with the added silica and alumina forms a geopolymeric matrix such as is known in cold ceramics. Although coal naturally contains small amounts of silica and/or alumina, it is believed that the amount of the materials naturally occurring in coal is not high enough to provide the geopolymeric matrix upon combustion. Further, the silica and alumina naturally occurring in coal is not necessarily balanced with the natural occurring calcium in order to provide optimum sulfur and/or mercury capture.

In various embodiments, the invention provides methods for improving the leaching quality of heavy metals such as mercury from coal. The methods involve adding sufficient silica and/or alumina to the coal to cause a geopolymer to form upon combustion. Preferably, the silica and alumina are added along with sufficient alkali powders to reduce sulfur pitting. The alkali powders tend to neutralize the silica and alumina, with formation of geopolymeric ash along with coupling silica and/or alumina to form a ceramic like matrix that reports as a stabilized ash. It may also be that the alumina and silica burning with the coal forms a refractory like mixture compound with mercury and/or other heavy metals. As a result, the resulting coal ash or fly ash containing heavy metals is resistant to leaching under standard conditions. As noted above, the non-leaching quality of the coal ash leads to commercial advantages because the product would no longer be considered as a hazardous material.

The invention has been described above with respect to various preferred embodiments. Further non-limiting disclosure of the invention is provided in the Examples that follow. They illustrate the effectiveness of the invention when a liquid only and a liquid/solid sorbent system are applied for mercury remediation of fuels.

EXAMPLE

Freeman Crown III coal is provided in pulverized form, with 70% by weight passing 200 mesh (i.e., about 70% of the coal by weight is present as particles with a diameter less than about 75 μm). No sorbent is added to the fuel before combustion, but is duct injected into the gaseous stream of the convective pathway downstream of the furnace in the 2200° F.-1500° F. zone. The liquid sorbent composition is injected at the rate of approximately 1.5% by weight (0.6% rate of addition of solids) based on the rate of combustion of the coal. The results of this testing are also presented in table 1. More than 98% of the mercury in the coal is captured in the ash.

TABLE 1

| Coal Type | parameter | Value | Sorbent Components | % Hg Reduction |
|---|---|---|---|---|
| Freeman Crown III | % Moisture | 10.46 | 20% CaNO$_3$ | 98.86 |
| | % Sulfur | 4.24 | 20% CaNO$_2$ | |
| | % Mercury | 8.53 μg/m$^3$ | 60% H2O | |
| | BTU value | 11,824 | | |

I claim:

1. A method for reducing the amount of mercury in combustion gases resulting from burning of mercury containing coal, comprising introducing a sorbent composition into the combustion gases in a zone where the temperature is greater than 500° C., wherein the sorbent composition comprises an effective amount of a nitrogenous component selected from the group consisting of a nitrate salt, a nitrite salt, and a combination of a nitrate salt and a nitrite salt.

2. A method according to claim 1, wherein the temperature of the combustion gases in the zone wherein the sorbent is introduced is in the temperature range of 1500° F. to 2300° F.

3. A method according to claim 1, wherein the sorbent composition comprises a nitrate salt and a nitrite salt.

4. A method according to claim 1, wherein the sorbent composition comprises calcium salts.

5. A method according to claim 1, wherein the sorbent composition comprises calcium nitrate and calcium nitrite.

6. A method according to claim 1, comprising introducing the sorbent composition at a rate to deliver from 0.01% to 10% by weight of the nitrate and/or nitrite salt, based on the total rate of coal consumption in combustion.

7. A method according to claim 6, wherein the delivery rate is from 0.1% to 1%.

8. A method according to claim 6, wherein the sorbent composition comprises calcium nitrite and/or calcium nitrate.

9. A method according to claim 1, further comprising measuring a level of mercury in the combustion gases and adjusting the rate of sorbent introduction, depending on the measured value.

10. A method for operating a fuel burning facility to reduce the amount of mercury released from the facility during combustion of a mercury containing fuel, the method comprising injecting a sorbent composition comprising a nitrate salt and/or a nitrite salt into flue gases where the temperature of the flue gas is in the range of 1500° F. to 2300° F., monitoring the level of mercury in the flue gases downstream of the sorbent injection point, and adjusting the rate of sorbent addition to achieve capture of 90% or greater of the mercury in the mercury containing fuel before emission from the fuel burning facility.

11. A method according to claim 10, wherein the sorbent composition comprises a nitrite salt and a nitrate salt.

12. A method according to claim 10, wherein the sorbent composition comprises calcium nitrite and calcium nitrate.

13. A method according to claim 10, comprising adding the sorbent composition at a rate to deliver from 0.01 to 3% by weight of the nitrate and/or nitrite salt, based on the rate of consumption of the mercury containing fuel during combustion.

14. A method for reducing sulfur and/or mercury emissions resulting from the combustion of coal in the furnace of a coal-burning system, comprising burning the coal in the presence of a nitrite salt and/or a nitrate salt, measuring the mercury level in flue gases resulting from the combustion, comparing the measured mercury level to a target level for emissions, and adjusting the level of addition of nitrite and/or nitrate salt depending on the measured mercury level.

15. A method according to claim 14, comprising burning the coal in the presence of calcium nitrate and/or calcium nitrite.

16. A method for burning coal with decreased emissions of mercury, comprising combusting coal in a coal burning system to produce flue gases and ash;

adding calcium nitrate and calcium nitrite into the coal burning system during combustion, measuring the level of mercury in the flue gases, and adjusting the amount of calcium nitrate and calcium nitrite added into the coal burning system depending on the measured level of mercury.

17. A method according to claim 16, comprising adding the calcium nitrate and calcium nitrite as solids onto the coal before combustion.

18. A method according to claim 16, comprising adding the calcium nitrate and calcium nitrite as a liquid onto the coal prior to combustion.

19. A method according to claim 16, comprising adding the calcium nitrate and calcium nitrite as a liquid into the furnace during combustion.

20. A method according to claim 16, comprising adding the calcium nitrate and calcium nitrite as a solid into the furnace during combustion.

21. A method according to claim 16, comprising adding the calcium nitrate and calcium nitrite as a liquid into the fireball during combustion.

22. A method according to claim 16, comprising adding the calcium nitrate and calcium nitrite as a solid into the fireball during combustion.

23. A method according to claim 16, comprising injecting the calcium nitrate and calcium nitrite as a liquid into a convective pathway downstream of the furnace.

24. A method according to claim 23, wherein the temperature of the flue gases in the convective pathway at the point of injection is greater than 1500° F. to 2300° F.

25. A method of burning carbonaceous mercury containing fuel in a fuel burning facility to reduce the amount of mercury released from the facility, the method comprising
   combusting the fuel in the fuel burning system;
   adding calcium nitrate and calcium nitrite into the fuel burning system during combustion;
   measuring a level of mercury in the flue gases resulting from the combustion; and
   adjusting the amount of calcium nitrite and calcium nitrate added into the coal burning system depending on the level of measured mercury.

26. A method according to claim 25, wherein the mercury containing fuel comprises municipal waste.

27. A method according to claim 25, wherein the mercury containing fuel comprises sewage sludge.

* * * * *

UNITED STATES PATENT AND TRADEMARK OFFICE
CERTIFICATE OF CORRECTION

PATENT NO. : 7,468,170 B2
APPLICATION NO. : 11/642733
DATED : December 23, 2008
INVENTOR(S) : Douglas C. Comrie It is certified that error appears in the above-identified patent and that said Letters Patent is hereby corrected as shown below:

Col. 4, line 12, after "use" insert -- of --

Col. 4, line 19, "nitrate" should be -- nitrite --

Col. 4, line 65, delete 1st occurrence of "the"

Col. 7, line 27, "0.1" should be -- 0.1% --

Col. 8, line 51, "1482°F" should be -- 1482°C --

Signed and Sealed this

Eighth Day of September, 2009

David J. Kappos
*Director of the United States Patent and Trademark Office*